United States Patent
Kaneda et al.

(10) Patent No.: US 6,532,133 B1
(45) Date of Patent: Mar. 11, 2003

(54) RECORDING MEDIUM CARTRIDGE WITH IMPROVED WELDING CHARACTERISTICS

(75) Inventors: Hiroshi Kaneda, Saku (JP); Kenji Hashizume, Nagano-ken (JP); Hisao Katoh, Saku (JP); Masatoshi Okamura, Saku (JP); Haruo Shiba, Komoro (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 08/059,840

(22) Filed: May 11, 1993

(30) Foreign Application Priority Data

| May 22, 1992 | (JP) | ............................................. 4-040951 |
| May 13, 1992 | (JP) | ............................................. 4-038631 |
| May 13, 1992 | (JP) | ............................................. 4-146955 |

(51) Int. Cl.⁷ ........................... G11B 23/03; B32B 31/16
(52) U.S. Cl. ........................ 360/132; 156/73.1; 360/133
(58) Field of Search ................................ 360/132, 133; 242/197, 198, 199, 200, 324; 156/73.1, 73.2, 580.1, 580.2; 369/291

(56) References Cited

U.S. PATENT DOCUMENTS

| 4,849,844 A | * | 7/1989 | Kato | ........................... 360/133 |
| 5,199,593 A | * | 4/1993 | Kita | ............................. 220/359 |

FOREIGN PATENT DOCUMENTS

| EP | 0214614 | * | 3/1987 | ................. 360/132 |
| GB | 2210352 | * | 6/1989 | ................. 360/132 |
| JP | 58133676 | | 8/1983 | |
| JP | 5941343 | | 3/1984 | |

* cited by examiner

Primary Examiner—William Klimowicz

(57) ABSTRACT

A recording medium cartridge capable of permitting energy to be effectively transmitted from a welding horn to a casing to highly improve welding between an upper casing member and a lower casing member which is carried out in order to integrally form the casing. The casing members are made of crystalline resin to which a filler such as glass fiber or the like is added.

23 Claims, 6 Drawing Sheets

RECORDING MEDIUM CARTRIDGE WITH IMPROVED WELDING CHARACTERISTICS

BACKGROUND OF THE INVENTION

This invention relates to a recording medium cartridge having a recording medium such as a magnetic tape, a flexible disc, a hard disc, an optical disc or the like housed or received therein, and more particularly to a recording medium cartridge such as a video tape cassette, an audio tape cassette, a disc cartridge or the like.

A recording medium for recording information or data thereon is generally apt to cause dust or the like to adhere thereto and be readily damaged. Also, the recording medium is adversely affected by a variation in temperature and required to exhibit convenience in handling. In view of the situation, the record medium is typically charged in a recording and/or reproducing unit while being received in a casing made of a synthetic resin material or in the form of a recording medium cassette or cartridge.

In the conventional recording medium cartridge, an upper casing member and a lower casing member each made of acrylonitrile-butadiene-styrene (ABS) resin, polycarbonate (PC) resin, polystyrene (PS) resin or the like are joined together by welding to provide the casing. The resins described above each permit welding between the upper casing member and the lower casing member to be satisfactorily carried out, however, they cause the casing to be readily scraped or ground to produce tailings and/or dust, which then adhere to a head of a recording and/or reproducing unit, its spindle, and/or the recording medium, leading to dropout and/or permanent error of data stored in the recording medium. Also, the casing is deteriorated in sliding properties to a degree sufficient to cause handling of the cartridge to be deteriorated.

Those skilled in the art would consider that the above-described problems are solved by forming the casing of crystalline resin which inherently exhibits satisfactory lubricous or sliding properties. Unfortunately, the crystalline resin is elastic and readily absorbs thermal or heat energy, to thereby render welding between the upper casing member and the lower casing member highly difficult. This causes conditions for the welding and a configuration of the welding to be substantially restricted, to thereby fail to increase productivity of the recording medium cartridge.

Referring now to FIG. 1, such a conventional recording medium cartridge as described above is illustrated. The recording medium cartridge shown in FIG. 1 is in the form of a video tape cassette. More particularly, in the conventional recording medium cartridge or video tape cassette, a casing for receiving a recording medium or a magnetic tape therein comprises an upper casing member 100 and a lower casing member 102 joined to each other by welding. For this purpose, the upper and lower casing members 100 and 102 are provided on surfaces thereof mating with each other with projections 104 for welding, respectively. Also, the upper and lower casing members 100 and 102 are formed on the projections 104 or surfaces of peripheral walls thereof mating with or opposite to each other with ribs 106. Then, the upper and lower casing members 100 and 102 are joined together through the projections 104 and/or ribs 106 by means of a welding horn 108. Thus, welding between both casing members 100 and 102 is carried out at positions centrally located in a vertical direction of the casing. Unfortunately, the positions are defined so as to be away by a distance as large as 10 to 14 mm from an outer surface of the casing member against which the welding horn 108 is abutted for welding. This fails to permit the welding to be successfully carried out. In particular, when the welding is carried out between the outer peripheral mating surfaces of the casing members, squeeze-out or extrusion of the resin material for the casing being melted occurs during and/or after the welding, to thereby deteriorate an appearance of the casing and therefore the cartridge. Also, when both casing members and therefore the projections 104 for welding are made of crystalline resin, a large amount of energy is required to melt the projections. Unfortunately, this often causes portions of both casing members other than the projections 104 to be concurrently melted together with the projections 104, resulting in further deteriorating the appearance.

Further, as will be noted from the foregoing, the casing of the conventional recording medium cassette or video tape cassette is increased in strength in a vertical direction thereof, however, it is decreased in strength or rigidity in longitudinal and lateral directions thereof; therefore, torsion applied to the casing or shock applied to the casing due to dropping of the cartridge, or the like causes separation of the upper and lower casing members from each other.

SUMMARY OF THE INVENTION

The present invention has been made in view of the foregoing disadvantages of the prior art.

Accordingly, it is an object of the present invention to provide a recording medium cartridge which is capable of being extensively increased in sliding properties and welding properties, to thereby facilitate the handling and increase the productivity.

It is another object of the present invention to provide a recording medium cartridge which is capable of permitting a welding operation to be smoothly accomplished with high efficiency.

It is a further object of the present invention to provide a recording medium cartridge which is capable of permitting a welding operation to be satisfactorily carried out to a degree sufficient to prevent an appearance of the cartridge from being deteriorated.

It is still another object of the present invention to provide a recording medium cartridge which is capable of carrying out a welding operation to be carried out while reducing loss of energy for welding to decrease vibrational energy required for welding.

It is yet another object of the present invention to provide a recording medium cartridge which is capable of exhibiting mechanical strength sufficient to permit the cartridge to endure torsion applied thereto, shock applied thereto due to dropping of the cartridge, or the like.

It is a still further object of the present invention to provide a recording medium cartridge which is capable of exhibiting high safety and reliability and increased bonding strength while keeping the structure simplified and the manufacturing cost reduced.

The term "recording medium cartridge" used herein, as will be readily understood to those skilled in the art, means a recording medium operated in a recording and/or reproducing unit while being received in a casing, such as a video tape cassette, an audio tape cassette, a disc cartridge and the like.

In accordance with the present invention, a recording medium cartridge is provided. The recording medium cartridge of the present invention includes a casing in which a recording medium is received. The casing comprises an upper casing member and a lower casing member jointed to each other. The upper and lower casing members are made of crystalline resin and jointed together by welding. The crystalline resin has a filler which permits the crystalline resin to exhibit improved welding properties incorporated therein.

The present invention constructed in the manner described above permits transmission of energy from an ultrasonic welding horn to the upper and lower casing members to be satisfactorily carried out to improve welding between both casing members, so that both casing members may be safely and effectively welded together. Also, the casing exhibits good sliding properties because of being formed of crystalline resin, to thereby effectively prevent damage to the recording medium in the casing and ensure charging of the cartridge in a recording and/or reproducing unit. Thus, the present invention effectively prevents scraping of the cartridge and dropout and permanent error of information or data stored in the recording medium.

In a preferred embodiment of the present invention, the recording medium cartridge may be in the form of a tape cassette, wherein the upper and lower casing members are joined through welded surfaces thereof to each other, and the welded surfaces are defined in a manner to be spaced by a distance corresponding to one eighth to one quarter as large as a total thickness of the casing from a surface of the casing with which a welding horn is kept contacted during welding.

In such construction, application of vibrational energy from the welding horn to the upper casing member permits the welded ribs to be melted to integrally join both casing members to each other. This results in preventing an appearance of the cartridge due to extrusion of the resin material from the casing from being deteriorated, reducing loss of energy output from the welding horn, facilitating and improving the welding operation, and reducing vibrational energy required for the welding.

In another preferred embodiment of the present invention, the upper and lower casing members are joined to each other through welded portions thereof. The welded portions comprise annular bosses provided on the upper and lower casing members so as to positionally correspond to each other. The bosses of one of the casing members each are formed therein with a central boss so as to project therefrom, which is fitted in corresponding one of the bosses of the other casing member.

Such construction permits the casing and therefore the cartridge to exhibit rigidity sufficient to endure torsion applied to the cartridge and shock applied thereto by dropping of the cartridge.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Figure 1:
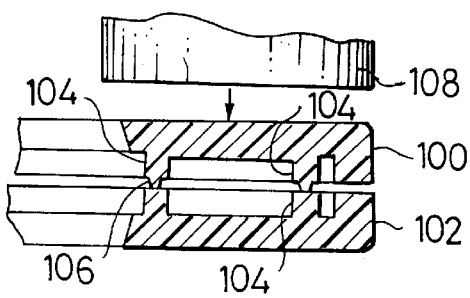
FIG. 1 is a fragmentary enlarged sectional view showing an essential part of a conventional recording medium cartridge.
Figure 5:
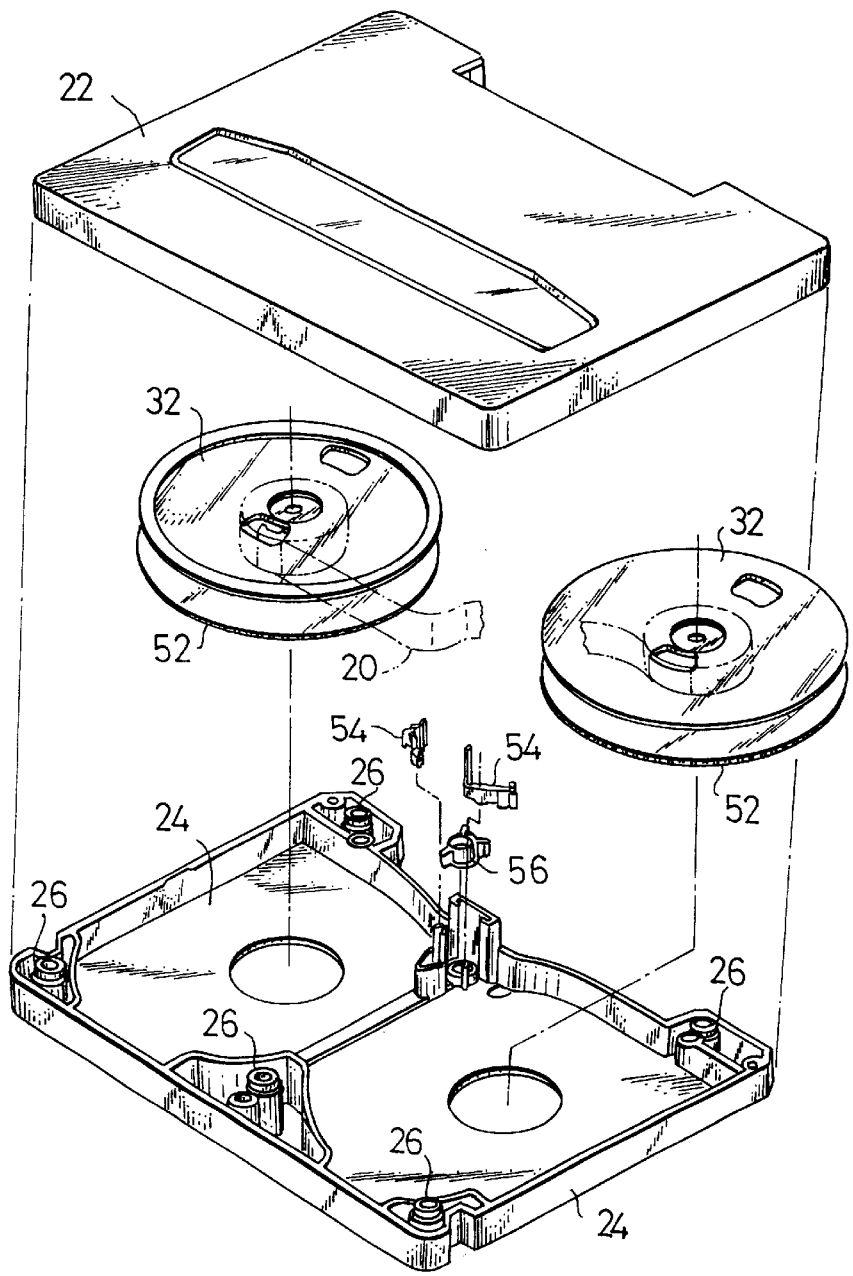
FIG. 5 is an exploded perspective view showing another embodiment of a recording medium cartridge according to the present invention.

Now, a recording medium cartridge according to the present invention will be described hereinafter with reference to 2 to 11, wherein like reference numerals designate like or corresponding parts throughout.

Figure 2:
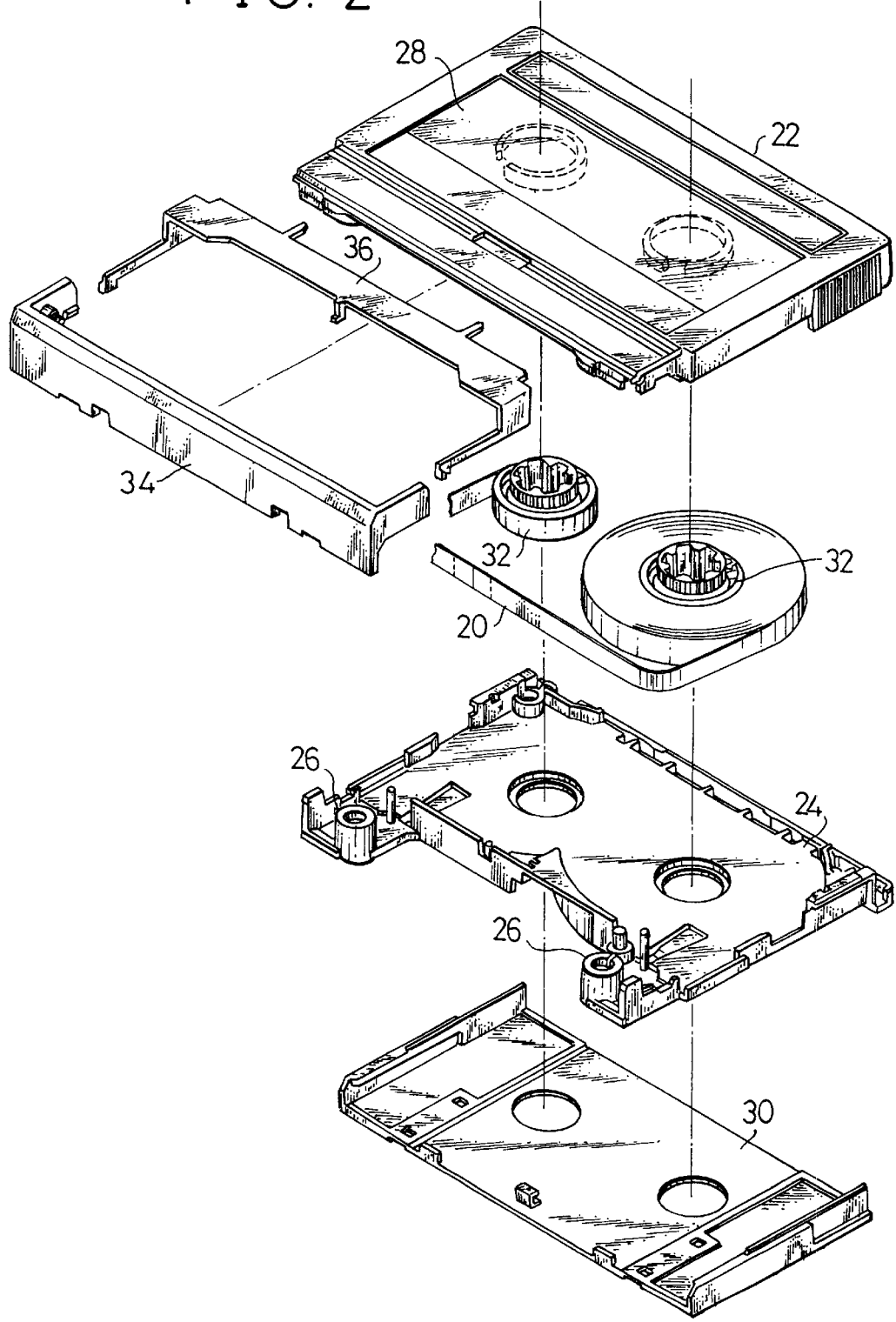
FIG. 2 is an exploded perspective view showing an embodiment of a recording medium cartridge according to the present invention.

Referring first to FIG. 2, an embodiment of a recording medium cartridge is illustrated. A recording medium cartridge of the illustrated embodiment is in the form of a digital audio tape (DAT) cassette.

Generally speaking, the recording medium cartridge or DAT cassette includes a casing in which a recording medium 20 in the form of an audio tape is received. The casing comprises an upper casing member 22 and a lower casing member 24 joined to each other by welding. The upper and lower casing members 22 and 24 each are made of crystalline resin and joined together by welding carried out at welded portions 26. Into the crystalline resin is incorporated a filler, as detailedly described hereinafter. The upper casing member 22 is provided with a transparent window 28 through which the residue of the magnetic tape 20 is observed and the lower casing member 24 is mounted thereon with a slider 30 in a manner to be slidable to selectively cover the lower casing member. The casing is also provided therein with a pair of reel hubs 32 on which the magnetic tape 20 is wound so as to extend therebetween. The reel hubs 32 are arranged in a manner to be rotatable in the casing. The casing is provided at a front portion thereof with an opening, at which a front lid 34 is pivotally arranged so as to selectively cover the opening. The cartridge of the illustrated embodiment further includes a hub brake 36 arranged so as to be accessible to the reel hubs 32 and actuated in association with the front lid 34.

In the recording medium cartridge of the illustrated embodiment generally constructed as described above, the crystalline resin may be selected from a group consisting of, for example, polypropylene, polyethylene and polyamide. Into the crystalline resin is incorporated a filler which improves transmission of energy in the crystalline resin, to thereby permit the crystalline resin to exhibit improved welding properties. For this purpose, the filler may be selected from a group consisting of, for example, glass fiber and calcium carbonate. The filler thus incorporated in the crystalline resin is contained in the crystalline resin in an amount of 10 to 30% by weight. A content of the filler below 10% by weight causes the welding properties of the crystalline resin to be deteriorated, whereas the content above 30% by weight causes heat resistance, resistance to thermal deformation, resistance to impact or shock, and strength of the casing to be deteriorated, as well as causes wearing of a mold for forming the casing and deterioration in moldability.

Figure 3:
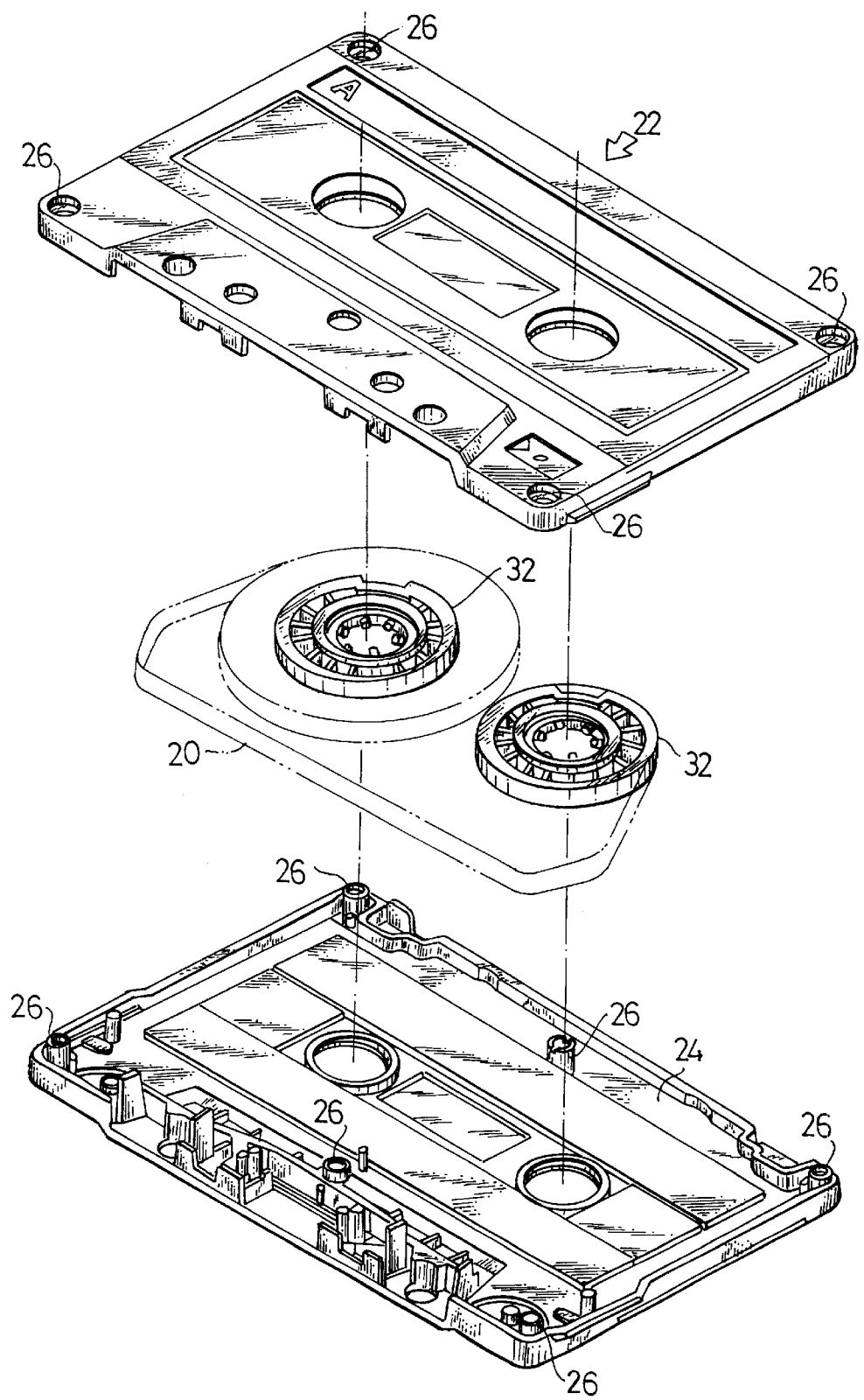
FIG. 3 is an exploded perspective view showing a modification of the recording medium cartridge shown in FIG. 2.

Referring now to FIG. 3, a modification of the embodiment of FIG. 1 is illustrated, which is in the form of an audio tape cassette. An upper casing member 22 and a lower casing member 24 are made of polyethylene resin likewise containing such a filler as described above and joined together by welding to form a casing, in which a pair of reel hubs 32 having a magnetic tape 20 wound thereon are rotatably arranged. The upper and lower casing members 22 and 24 each are provided with welding portions 26, through which both casing members 22 and 24 are joined together by ultrasonic welding. The remaining part of the modification may be constructed in substantially the same manner as the embodiment of FIG. 2

Figure 4:
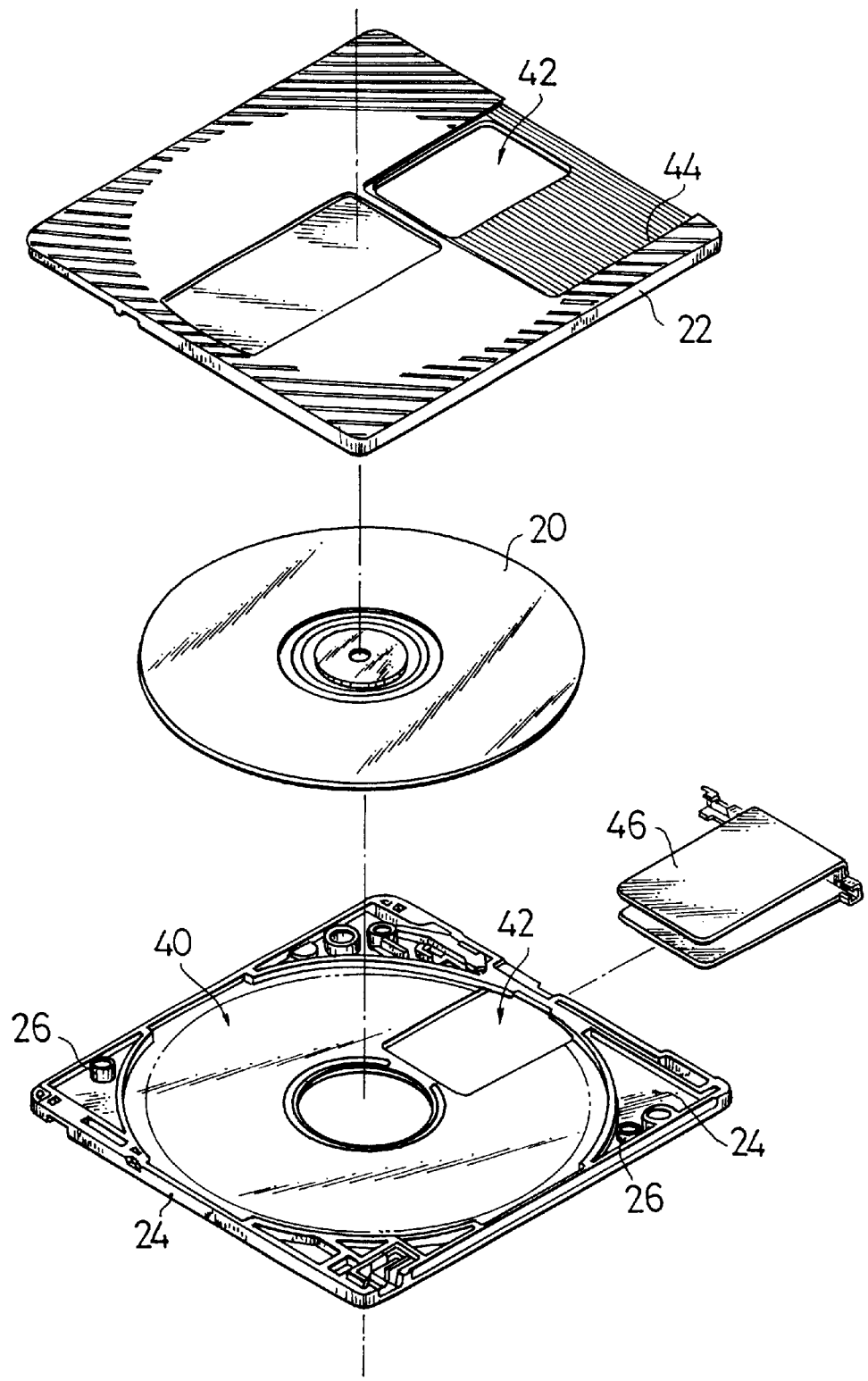
FIG. 4 is an exploded perspective view showing another modification of the recording medium cartridge shown in FIG. 2.

FIG. 4 shows another embodiment of a recording medium cartridge according to the present invention. A recording medium cartridge of the illustrated embodiment is in the form of a disc cartridge. The cartridge likewise includes a casing comprising an upper casing member 22 and a lower casing member 24 each made of polyamide resin having a filler added thereto as described above. The casing is formed therein with an inner space 40 in which a recording medium or disc 20 is rotatably received. The casing is also formed with an opening 42 such as a head inserting opening and provided with a shutter area 44. The opening 42 is selectively covered by a shutter 46 slidably fitted on the shutter area 44. The upper and lower casing members 22 and 24 are provided with welded portions 26 in a manner to positionally correspond to each other, through which both casing members are integrally joined to each other by welding.

As can be seen from the foregoing, the recording medium cartridge of each of the embodiments shown in FIGS. 2 to 4 is so constructed that the upper and lower casing members 22 and 24 which are joined together to provide the casing are made of the crystalline resin having the specified filler added thereto. Thus, irrespective of the fact that the crystalline resin inherently readily absorbs thermal energy, addition of the filler to the crystalline resin permits the crystalline resin to satisfactorily exhibit sufficient energy transmitting properties, resulting in the welding properties of the crystalline resin may be highly improved. Thus, the illustrated embodiment permits conditions for the welding to be substantially relieved and workability to be improved, as well as reliability and endurance of the recording medium cartridge to be increased.

Figure 6:
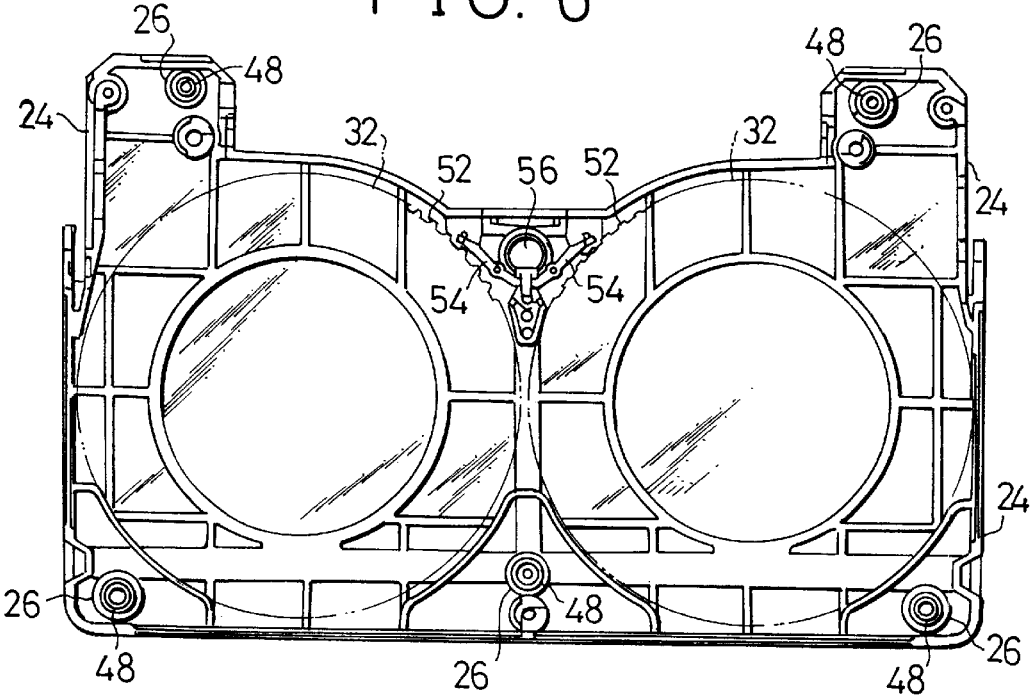
FIG. 6 is a plan view showing a lower casing member of the recording medium cartridge of FIG. 5.
Figure 7:
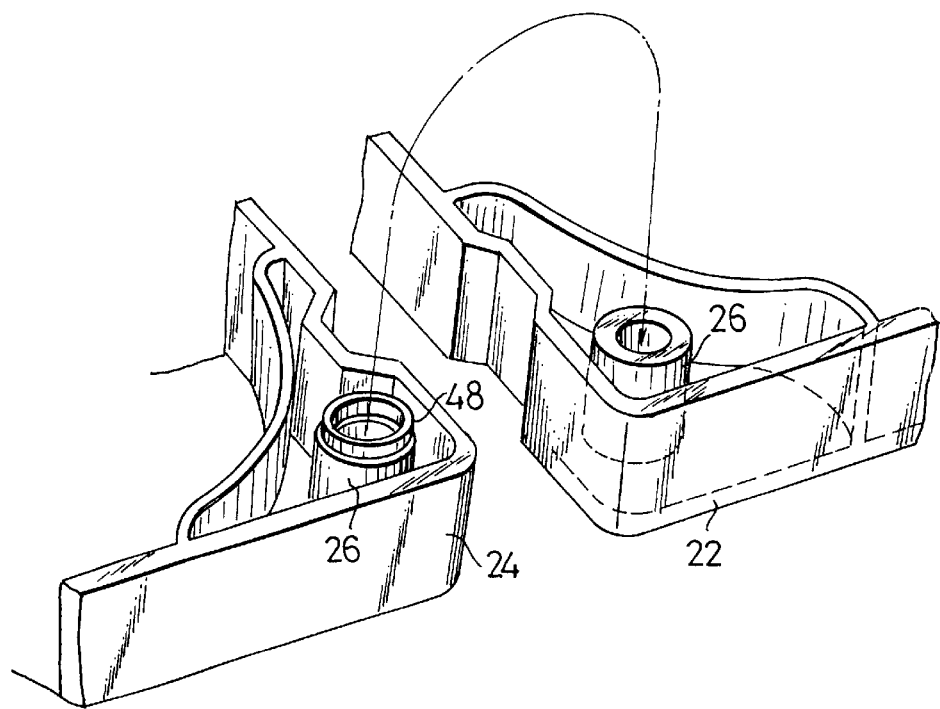
FIG. 7 is a fragmentary exploded perspective view showing an essential part of the recording medium cartridge of FIG. 5.
Figure 8:
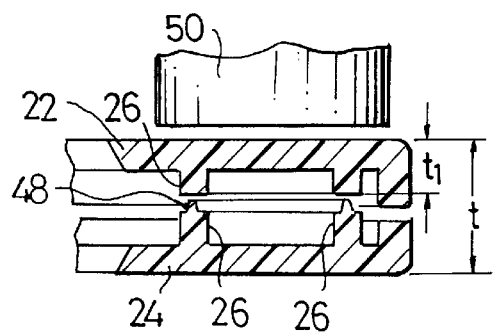
FIG. 8 is a fragmentary exploded vertical sectional view showing joining between an upper casing member and a lower casing member in the recording medium cartridge of FIG. 5.

Referring now to FIGS. 5 to 8, another embodiment of a recording medium cartridge according to the present invention is illustrated, which is in the form of a tape cassette. In a recording medium cartridge of the illustrated embodiment, a casing likewise comprises an upper casing member 22 and a lower casing member 24 each made of polypropylene resin having a filler added thereto. The upper and lower casing members 22 and 24 are provided with welded portions 26, which are formed in the shape of hollow cylindrical projections and through which both casing members 22 and 24 are joined together by welding. In the illustrated embodiment, the welded portions 26 are arranged on an inner surface of each of both casing members so as to positionally correspond to each other. Alternatively, they may be provided on an inner surface of any one of both casing members. The welded portions or projections 26 of any one of both casing members 22 and 24 each are provided on an top surface thereof with a welded rib 48. In the illustrated embodiment, the welded rib 48 is provided on each of the welded portions 26 of the lower casing member 24, as shown in FIGS. 6 and 7. Each of the welded ribs 48 is formed so as to be abutted against or fitted in an inner surface of the corresponding projection of the upper casing member 22. Then, the welded ribs 48 thus fitted in the projections 26 of the upper casing member 24 are melted by a welding horn 50 arranged on an outer surface of the upper casing member 22, to thereby cause the corresponding welded portions 26 of both casing members 22 and 24 to be bonded together, resulting in the casing members being joined together. In the illustrated embodiment, welded surfaces of the upper and lower casing members through which both casing members are joined together are defined at a position spaced from the surface of the casing with which the welding horn 50 is contacted by a distance $t_1$ corresponding to one-eighth to one-quarter as large as a whole thickness t of the casing.

Alternatively, the welding operation may be carried out while keeping the welding horn 50 contacted with an outer surface of the lower casing member 24. Also, a distance between the welded rib 48 and the welding horn 50 is preferably defined as small as possible. For example, it may be preferably defined to be one-quarter inch or less from the welding horn 50. The distance exceeding one-quarter inch from the welding horn 50 causes the welding operation to be highly troublesome and difficult. The welded portions 26 each comprising a projection may be arranged at any suitable positions other than a recording medium receiving space. For example, they may be arranged at four corners of the casing which are positions like conventional tapping positions, a central area of the casing or the like. Such arrangement of the welded portions permits the casing to exhibit a satisfactory balance and increased rigidity and effectively prevents extrusion of the resin material to eliminate deterioration in appearance of the cartridge.

The casing formed by joining the upper and lower casing members 22 and 24 together as described above is provided therein with a pair of reel hubs 32 in a manner to be rotatable, on which a recording medium or magnetic tape is wound so as to extend therebetween. The reel hubs 32 each are formed with teeth 52 for engagement. Correspondingly, the casing is provided therein with a pair of reel brakes 54 which are selectively engaged with the teeth 52 of the reel hubs 32 to regulate rotation of the reel hubs. For this purpose, the reel brakes 54 are elastically urged and operatively connected to a release lever 56, which is adapted to be engaged with a release pin arranged on the side of a recording and/or reproducing unit.

Figure 9:
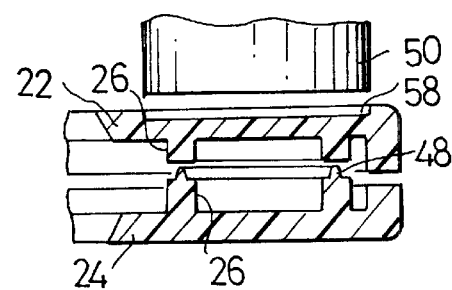
FIG. 9 is a fragmentary exploded vertical sectional view showing joining between an upper casing member and a lower casing member in a modification of the recording medium cartridge of FIG. 5.

FIG. 9 shows a modification of the embodiment described above with reference to FIGS. 5 to 8. In a recording medium of the modification, an upper casing member 22 or a lower casing member 24 is formed with a recess 58 in which a distal end of a welding horn 50 is kept received during welding. Such construction further reduces energy loss during the welding operation irrespective of the fact that the casing is made of crystalline resin such as polypropylene resin in which such a filler as described above. Also, it further facilitates the welding operation.

As described above, in the embodiment shown in FIGS. 5 to 9, one of the upper and lower casing members 22 and 24 is provided with the welded portions each comprising the projection 26 which is formed into a hollow cylindrical shape and provided on the top surface thereof with the welded rib 48 of a continuous or intermittent ring-like shape and the other of the casing members is provided on the inner surface thereof with the welded portions or projections 26 of a hollow cylindrical shape or solid column-like shape in a manner to positionally correspond to the projections 26 provided with the ribs 48. Such construction permits the welding to be accomplished with high accuracy and improves the workability.

As can be seen from the foregoing, the recording medium cartridge of the illustrated embodiment is so constructed that the casing for receiving the recording medium therein comprises the upper and lower casing members made of the filler-containing crystalline resin and joined together through the welded portions by welding, wherein the surfaces of the casing members joined to each other are defined so as to be spaced by a distance of one eighth to one quarter as large as a total thickness of the casing from the surface of the casing with which the welding horn is kept contacted during the welding operation. Such arrangement of the present invention effectively prevents extrusion of the resin material from the casing during and/or after the welding operation to prevent deterioration in appearance of the cartridge and significantly reduces energy loss during the welding operation, as well as further facilitate the welding operation while decreasing vibrational energy required for welding.

Figure 10:
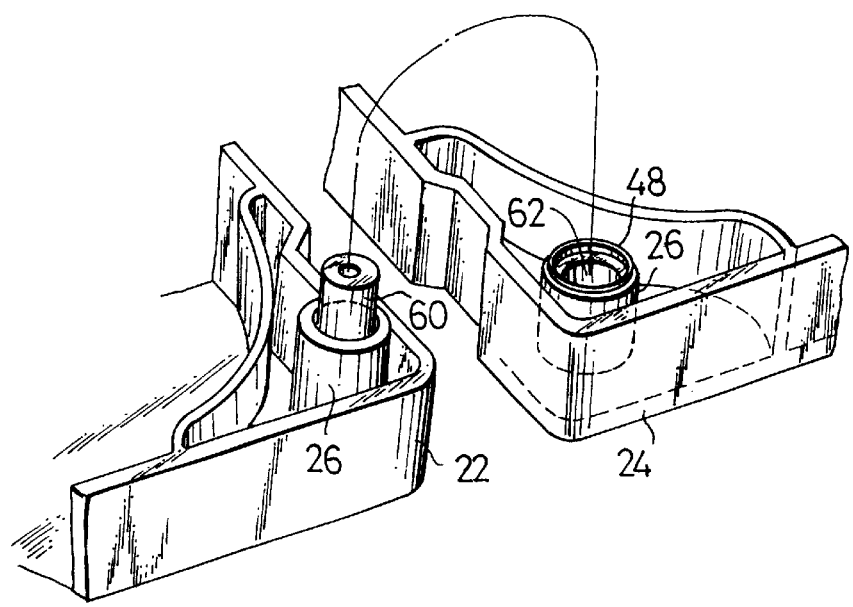
FIG. 10 is a fragmentary exploded perspective view showing an essential part of a further embodiment of a recording medium cartridge according to the present invention.
Figure 11:
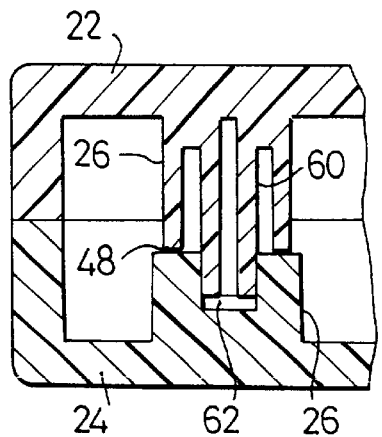
FIG. 11 is a fragmentary vertical sectional view showing joining between an upper casing member and a lower casing member in the recording medium cartridge of FIG. 10.

Referring now to FIGS. 10 and 11, a further embodiment of a recording medium cartridge according to the present invention is illustrated. A recording medium cartridge of the illustrated embodiment is in the form of a tape cassette. The recording medium cartridge includes a casing comprising an upper casing member 22 and a lower casing member 24 made of crystalline resin having such a filler as described above contained therein and joined together by welding. For this purpose, at least one of the upper and lower casing members 22 and 24 is provided on an inner surface thereof with a plurality of welded portions 26. In the illustrated embodiment, the welded portions 26 are arranged on the inner surface of each of both casing members 22 and 24 so as to positionally correspond or be opposite to each other and formed into a shape like an annular boss. The bosses 26 of any one of both casing members 22 and 24 each are provided on a top surface thereof with a welded rib 48. In the illustrated embodiment, the welded rib 48 is arranged on the boss 26 of the lower casing member 22 and abutted against a top surface of the corresponding welded portion or boss 26 of the upper casing member 22. Then, welding between both casing members is carried out in the same manner as described using a welding horn. Further, in the illustrated embodiment, each of the annular bosses 26 of the upper casing member 22 is provided therein with a central boss 60 so as to project therefrom as shown in FIG. 10, which is fitted in a hole 62 of corresponding one of the bosses 26 of the lower casing member 24 for the welding, so that integral joining between both casing members 22 and 24 may be satisfactorily carried out. The crystalline resin and filler for the casing and the amount of filler may be the same as those in the above-described embodiments.

The welded portions or annular bosses 26 may be arranged at four corners of the casing which are positions like conventional tapping positions, a central area of the casing or the like, other than a recording medium receiving space. Such arrangement of the welded portions permits the casing to exhibit a satisfactory balance and increased rigidity and effectively prevents extrusion of the resin material from the casing during and/or after the welding operation, to thereby eliminate deterioration in appearance of the cartridge.

The remaining part of the illustrated embodiment may be constructed in substantially the same manner as the embodiment described above with reference to FIGS. 5 to 9.

As can be seen from the foregoing, the illustrated embodiment is so constructed that the welded portions of the upper and lower casing members comprise annular bosses, wherein the bosses of one of the casing members each are formed with the central boss which is fitted in corresponding one of the bosses of the other casing member. Such construction permits the casing and therefore the cartridge to exhibit rigidity sufficient to endure torsion applied to the cartridge and shock applied thereto by dropping of the cartridge or the like.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A recording medium cartridge comprising:
   a casing in which a recording medium is received;
   said casing comprising an upper casing member and a lower casing member jointed to each other;
   said upper and lower casing members being made of crystalline resin and jointed together by welding;
   said crystalline resin having a filler which permits said crystalline resin to exhibit improved welding properties incorporated therein, said filler constitutes 10 percent to 30 percent by weight of the crystalline resin mixture.

2. A recording medium cartridge as defined in claim 1, wherein said filler is selected from a group consisting of glass fiber and calcium carbonate.

3. A recording medium cartridge as defined in claim 2, wherein said crystalline resin is selected from a group consisting of polypropylene, polyethylene and polyamide.

4. A recording medium cartridge as defined in claim 1, wherein said crystalline resin is selected from a group consisting of polypropylene, polyethylene and polyamide.

5. A recording medium cartridge as defined in claim 1, wherein said recording medium cartridge is a tape cassette.

6. A recording medium cartridge as defined in claim 5, wherein said upper and lower casing members are joined through welded surfaces thereof to each other;
   said welded surfaces being defined in a manner to be spaced by a distance corresponding to one eighth to one quarter as large as a total thickness of said casing from a surface of the casing with which a welding horn is kept contacted during welding.

7. A recording medium cartridge as defined in claim 6, wherein said casing is made of polypropylene resin;
   said upper and lower casing members being provided on an inner surface thereof with projections each acting as a welded portion in a manner to positionally correspond to each other;
   said projections of at least one of said upper and lower casing members each being provided on a surface thereof abutted against the corresponding projection of the other casing member with a welded rib.

8. A recording medium cartridge as defined in claim 7, wherein said casing is provided thereon with a recess for receiving a distal end of said welding horn.

9. A recording medium cartridge as defined in claim 7, wherein said projections each are formed into a hollow cylindrical shape;
said welded rib being formed into a ring-like shape and provided on a top surface of said projection.

10. A recording medium cartridge as defined in claim 6, wherein said casing is provided thereon with a recess for receiving a distal end of said welding horn.

11. A recording medium cartridge as defined in claim 6, wherein said projections each are formed into a hollow cylindrical shape;
said welded rib being formed into a ring-like shape and provided on a top surface of said projection.

12. A recording medium cartridge as defined in claim 5, wherein said upper and lower casing members are joined through welded portions thereof to each other;
said welded portions comprising annular bosses provided on said upper and lower casing members so as to positionally correspond to each other;
said bosses of one of said casing members each being formed therein with a central boss, which is fitted in corresponding one of said bosses of the other casing member.

13. In a recording medium cartridge formed from a pair of molded casing members that are welded together by ultrasonic energy, the improvement comprising:
each cashing member is formed from a crystalline resin and a filler material, the filler material having a characteristic of increasing the ultrasonic welding properties of the molded casing member, wherein said filler material is contained in said crystalline resin in an amount of 10 to 30% by weight;
a plurality of projection members extend from one surface of each molding casing member are respectively aligned when the respective casing members are contacted together for welding; and
means, indented on a surface of one casing member to receive a welding horn, for transmission of an application of ultrasonic energy to the contacted surfaces of the projection means.

14. A recording medium cartridge as defined in claim 13 wherein a projection member on one casing member includes a cylindrical boss and a projection member on the other casing member has an annular recess to receive and contact the boss.

15. A recording medium cartridge as defined in claim 13 wherein a projection member on one casing member includes an annular ring member with a flat surface and a corresponding projection member on the other casing member includes an annular ring member with a welding rib.

16. A recording medium cartridge as defined in claim 13 wherein said filler material is selected from a group consisting of glass fiber and calcium carbonate.

17. A recording medium cartridge as defined in claim 16 wherein said crystalline resin is selected from a group consisting of polypropylene, polyethylene and polyamide.

18. Improved recording medium cartridge housing shells capable of being welded together to form a unitary cartridge comprising:
a first and second housing shell, each configured to provide a portion of the unitary cartridge for supporting a recording medium, each of the housing shells are molded from a combination of crystalline resin and a filler material, the filler material represents between 10 and 30% by weight of the combination;
the first housing shell includes a first cylindrical projection having a flat annular weld surface, the second housing shell includes a second cylindrical projection of a complementary configuration to the first cylindrical projection with a welding rib extending from the second cylindrical projection, the relative dimensions of the first and second cylindrical projections are such that when the first and second housing shells are welded together, a welded portion is within one eighth to one quarter of a total thickness of the unitary cartridge to an exterior side of the cartridge.

19. The invention of claim 18 wherein the filler material is a glass fiber.

20. The invention of claim 18 wherein one of the housing shells includes solid recessed surface for receiving a distal end of a welding horn.

21. The invention of claim 18 wherein the first and second cylindrical projections have a hollow recess.

22. The invention of claim 18 wherein the crystalline resin is polyethylene.

23. Improved recording medium cartridge housing shells capable of being welded together to form a unitary cartridge comprising:
a first and second housing shell, each configured to provide a portion of the unitary cartridge for supporting a recording medium, each of the housing shells are molded from a combination of crystalline resin and a glass fiber material, the glass fiber material represents between 10 and 30% by weight of the combination;
the first housing shell includes a first cylindrical projection having a flat annular weld surface, the second housing shell includes a second cylindrical projection of a complementary configuration to the first cylindrical projection with a welding rib extending from the second cylindrical projection, the relative dimensions of the first and second cylindrical projections are such that when the first and second housing shells are welded together, a welded portion is within one eighth to one quarter of a total thickness of the unitary cartridge to an exterior side of the cartridge, wherein the first and second cylindrical projections have a hollow recess.

* * * * *